Dec. 18, 1928.  1,695,758
PIO CANTINI S
AUTOMATICALLY DIRIGIBLE HEADLIGHTS FOR VEHICLES
Filed Sept. 6, 1927
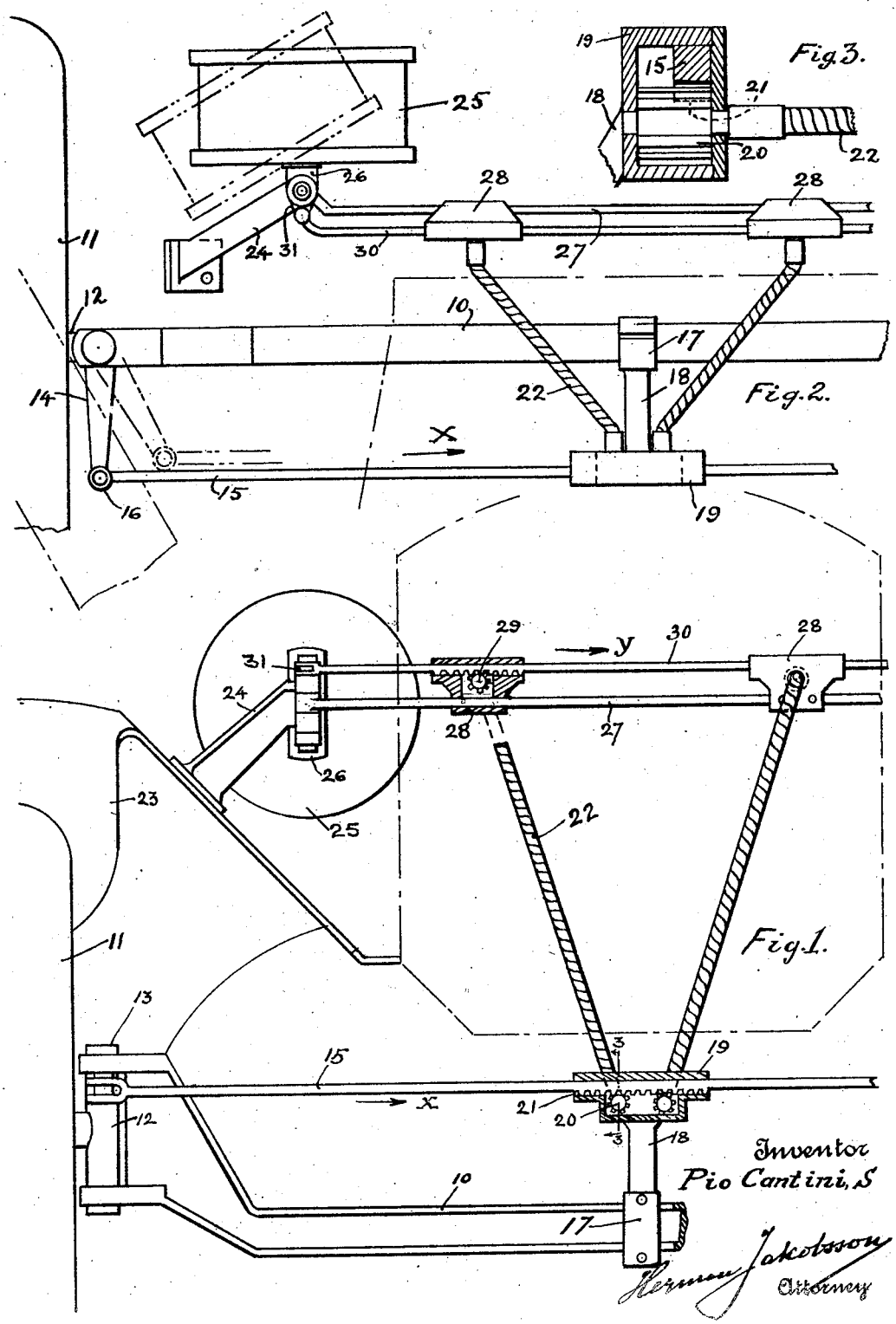

Patented Dec. 18, 1928.

1,695,758

UNITED STATES PATENT OFFICE.

PIO CANTINI S, OF BOGOTA, COLOMBIA.

AUTOMATICALLY-DIRIGIBLE HEADLIGHT FOR VEHICLES.

Application filed September 6, 1927. Serial No. 217,867.

My invention relates to headlights for automobiles or other vehicles, arranged to be automatically operated by the steering gear, so that the headlights turn synchronously with the front or steering wheels of the vehicle and substantially the same angle. It will be evident that the invention is also applicable to other vehicles having a steering gear, such as nautical and aero-nautical vessels.

The invention is suitable not only for new headlights, but may be equally well installed on existing lamps without difficulty and at a very moderate cost.

The main object of the invention is to provide lamps that will throw a beam of light in front of the vehicle, not only when the latter follows a straight course, but also when turning a curve. With ordinary fixed headlights there will always be a dark unlighted space on that side of the vehicle in the direction of which it is turning. This is a serious disadvantage and may cause accidents not only to the occupants of the vehicle but also to persons finding themselves in the shaded section.

It is now the object of my invention to overcome these disadvantages.

In the accompanying drawing one embodiment of my invention is illustrated, and

Figure 1 shows a rear elevation and part section of the device as applied to an automobile;

Figure 2, a top plan view of Fig. 1, and

Figure 3, a section along line 3—3 of Fig. 1 showing some details in larger scale.

In the drawing reference numeral 10 indicates the wheel axle of the automobile and 11 a front wheel journaled in the usual manner on the steering spindle 12 which is mounted to swing on the end of the wheel axle around the bolt 13. The steering rod 15 connects the steering arms 14 on the right and left hand spindles 12 by means of joints 16. The above is the usual automobile construction and forms no part of the present invention.

Centrally on the wheel axle 10 is provided a gear bracket 17 secured thereon by bolts or the like and having a rearwardly directed arm 18 at the end of which is situated the housing 19 for the two pinions 20 meshing with the rack teeth 21 provided on the steering rod 15. The latter is adapted to run freely in its length direction thru the housing 19 when actuated by the steering gear shaft (not shown) and is also permitted to have a front and rear displacement sufficient to make up for the radial swing of the hinge joints 16 at its ends. For this purpose the housing 19 is considerably wider than the thickness of the steering rod 15, as best seen in Fig. 3 of the drawing, but the pinions 20 have a length substantially equal to the width of the space in the housing in order to always be in mesh with the rack teeth 21 in whatever position the steering rod is situated. The ends of the pinion spindles project outside the housing wall and are adapted to receive the ends of the cables 22 which are used as flexible shafts to transmit the turning movement of the pinions 20.

Attached to the mudguard 23 is a bracket 24 for the headlight or lamp 25 hinged by its lug 26 to swing sideways on the bracket. The latter is crossconnected by means of a stiffening rod 27 with a similar bracket on the other side of the automobile. This rod is rigidly secured as by bolts or rivets to the gear housing 28 for a pinion 29 with its spindle. As indicated on the drawing, there are preferably two of these gear housings one for each lamp, but I may use only one to operate both lamps. The pinion 29 meshes with rack teeth on a sliding bar 30 which has hinge connection at its ends with the rearwardly directed ears 31 on the lamp lugs 26. The pinions 29 are positively connected thru the flexible shafts 22 with their respective drive pinions 20 so that, with the several parts arranged as indicated on the drawing, all four pinions turn simultaneously in the same direction.

When the vehicle is following a straight course and the front wheels are held by the steering gear parallel with the longitudinal vertical plane of the vehicle, then the lamps will also point straight ahead. As soon as the front wheels are turned out of the normal position by the steering gear, then the lamps will also turn. If, for instance, the steering rod 15 is drawn to right of the drawing, as indicated by arrow $x$, then the front wheels 11 will be swung by the arms 14 so that the vehicle makes a left turn. The rack teeth 21 meshing with pinions 20 will then turn the latter in clockwise direction as seen on the drawing, which movement is communicated thru the flexible shafts 22 to the pinions 29 which will also turn clockwise and draw the sliding bar 30 to the right of the drawing or as indicated by arrow *y*. As a consequence the lamps or headlights 25 actuated thru the ears 31 by the bar 30, will swing to the left, following the wheels 11.

It will thus be seen that whenever the vehicle turns to go around a curve, the headlights will turn in the same direction and illuminate a considerable area of the path along which the vehicle is going to turn, instead of leaving the same dark and lighting the course from which it is turning, which is the case with fixed headlights.

Directly the steering gear of the vehicle turns the front wheels to run parallel with the rear wheels, the headlights will also point straight ahead.

One advantage of using this device is that it will make spotlights unnecessary, these otherwise often being used to light the space to one side of the vehicle when turning a curve.

It is evident that my automatically dirigible headlights will be applicable to other uses than for automobiles and when in the claims the term "vehicle" is used, I intend this to include such means of transportation as airships, aeroplanes and seagoing vessels. In that case, where a rudder is used instead of front or rear wheels to steer the vehicle, the lamps are similarly and positively connected with the steering gear which thus actuates the lamps to swing either in horizontal or vertical plane or both.

It is to be understood that my invention as here disclosed is not limited to the details of construction shown and described and that these may be varied widely without departing from the spirit of the invention as disclosed by the claims.

I claim:

1. In a motor vehicle provided with a pair of steering wheels and a steering rod having positive connection with the wheels; of brackets secured to the vehicle, headlights journaled on the brackets, ears on the headlights, a toothed bar having hinged connection with said ears, a connecting member between the brackets, gear housings secured on said member permitting reciprocation of the toothed bar therein, pinions mounted with their axes horizontally in said housings meshing with the bar teeth, another gear housing fixedly mounted on the vehicle permitting reciprocation of the steering rod therein, said bar running substantially parallel with said rod and transversely of the vehicle, a tooth rack on the steering rod, pinions mounted with their axes horizontally in the second housing meshing with the tooth rack, and flexible shafts connecting the pinions in said other housing with the corresponding pinions in the first housings, said gear housing adapted to permit a limited movement of the toothed bar and the steering rod in axial direction of the pinions, whereby the headlights are caused to swing with the wheels and substantially the same angle, substantially as set forth.

2. The combination with a steering gear of a vehicle including a course directing member and a steering element therefor; of a lamp journaled on the vehicle and having a lever arm adapted to turn the lamp in the same direction as said member, a housing fixedly mounted in which the steering element is arranged to reciprocate, a second housing fixedly mounted, a bar adapted to slide in said second housing and having positive connection with said lever arm, and means actuated by the steering element adapted to cause said bar to slide, thereby turning the lamp, said bar running substantially parallel with the steering element; said means comprising teeth on said element and on said bar, pinions mounted with their axes horizontally in said housings and meshing with the respective teeth, and flexible shaft connections between the pinions.

In testimony whereof I affix my signature.

PIO CANTINI S.